US012730226B2

(12) United States Patent
Jandak et al.

(10) Patent No.: US 12,730,226 B2
(45) Date of Patent: Sep. 8, 2026

(54) TIME MULTIPLEX OF LIDAR AIR-DATA OPTICAL CHANNELS

(71) Applicant: Honeywell International Inc., Charlotte, NC (US)

(72) Inventors: Mikulas Jandak, KolÃn (CZ); Jan Pekarek, Brno (CZ); Zbynek Drasal, Prague (CZ); Viktor Drazan, Brno (CZ); Jan Popelka, Neslovice (CZ); Jan Oklestek, Brno (CZ)

(73) Assignee: Honeywell Aerospace LLC US, Phoenix, AZ (US)

(*) Notice: Subject to any disclaimer, the term of this patent is extended or adjusted under 35 U.S.C. 154(b) by 589 days.

(21) Appl. No.: 18/447,148

(22) Filed: Aug. 9, 2023

(65) Prior Publication Data

US 2025/0052905 A1 Feb. 13, 2025

(51) Int. Cl.
*G01S 17/95* (2006.01)

(52) U.S. Cl.
CPC .................................... *G01S 17/95* (2013.01)

(58) Field of Classification Search
None
See application file for complete search history.

(56) References Cited

U.S. PATENT DOCUMENTS 5,598,263 A 1/1997 Safa
6,556,282 B2 4/2003 Jamieson et al.
7,495,774 B2 2/2009 Hays et al.
8,908,160 B2 12/2014 Dakin et al.
2009/0235127 A1* 9/2009 Ohishi .................. G01S 7/4865 714/E11.023
2011/0157603 A1* 6/2011 Alvarez Diez ........ G01B 11/14 356/614
2011/0188029 A1 8/2011 Schmitt et al.
2019/0064332 A1 2/2019 Schmalenberg et al.
2022/0091007 A1 3/2022 Fan et al.
2022/0146411 A1 5/2022 Lombard et al.

FOREIGN PATENT DOCUMENTS

CN 110927744 A 3/2020
EP 3859396 A1 8/2021
WO 2023019498 A1 2/2023

OTHER PUBLICATIONS

European Patent Office, “Extended European Search Report”, dated Dec. 11, 2024, from EP Application No. 24188568.0, from Foreign Counterpart to U.S. Appl. No. 18/447,148, pp. 1 through 9, Published: EP.

* cited by examiner

*Primary Examiner* — Hovhannes Baghdasaryan
(74) *Attorney, Agent, or Firm* — Fogg & Powers LLC

(57) ABSTRACT

Various embodiments describe time-multiplexing of optical channels in an air data sensor. At least one switch outputs a reference optical signal, and each of a plurality of backscattered optical signals to at least one common optical path at a time. Alternatively stated, the at least one common optical path is configured to receive the reference optical signal and at least one of the backscattered optical signals in sequence. In doing so, the extent of systematic bias present in the at least one common optical path can be compensated for and even reduced during sensor operation.

20 Claims, 9 Drawing Sheets

TIME MULTIPLEX OF LIDAR AIR-DATA OPTICAL CHANNELS

BACKGROUND

Vehicles such as aircraft are typically equipped with static-pitot tubes. Such sensors are installed on one or more positions of the vehicle and are configured to determine environmental parameters that describe various characteristics of the environment of the vehicle, including the relative velocity and direction of wind with respect to the aircraft. Because pitot tubes require direct contact with the environment, pitot-tubes may suffer malfunctions due to icy conditions, blockage by particles, and their precision may be compromised due to the interaction of air with the exterior of the aircraft. Malfunction of pitot tubes could result in catastrophic accidents. Lidar-based sensors improve on the shortcomings of pitot tubes. Like pitot tubes, these sensors can measure direction and the relative velocity of wind with respect to the aircraft, but are not as prone to malfunctions and do not require direct contact with the environment. Moreover, a lidar sensor can also measure air data parameters such as atmospheric particle and cloud composition proximate to the aircraft.

A lidar sensor includes a ferrule comprising multiple optical fibers for transporting both reference signals and backscattered signals received from the environment for processing and determining parameters. Each optical fiber corresponds to a particular set of signals (e.g., the reference signal and for each of the backscattered channels). However, when processing data from optical signals, undesirable bias arises due to imperfections in the production of the ferrule and also for the difference in optical path length for the various channels. Such bias attributable to the structural and material properties of the optical fibers is referred to herein as "systematic bias." Left unchecked, systematic bias can result in environmental parameters that are inaccurate, which risks reliance on faulty data by other systems and/or the vehicle operator during aircraft maneuvering.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, an air data sensor is disclosed. The air data sensor comprises a light source configured to generate a reference optical signal. The air data sensor comprises an optical transceiver coupled to the light source. The optical transceiver is configured to transmit the reference optical signal external to the air data sensor in a plurality of directions, and in response to receive backscattered optical signals from each of the plurality of directions. The air data sensor comprises at least one switch coupled to the optical transceiver. The at least one switch is configured to output the reference optical signal and at least one of the backscattered optical signals to at least one common optical path. In a first configuration the at least one switch is configured to output the reference optical signal to the at least one common optical path. In a second configuration, the at least one switch is configured to output the at least one of the backscattered optical signals to the at least one common optical path. The air data sensor comprises a detector coupled to the at least one switch via the at least one common optical path and configured to detect the reference optical signal and the backscattered optical signals received from the at least one switch. The air data sensor comprises at least one processor coupled to the detector and the at least one switch. The at least one processor is configured to receive the reference optical signal and the backscattered optical signals, and to set the at least one switch in the first configuration or the second configuration.

In another embodiment, a system is disclosed. The system comprises a light source coupled to a vehicle and configured to generate a reference optical signal. The system comprises an optical transceiver coupled to the light source. The optical transceiver is configured to transmit the reference optical signal external to the vehicle in a plurality of directions, and in response to receive backscattered optical signals from each of the plurality of directions. The system comprises at least one switch coupled to the optical transceiver. The at least one switch is configured to output the reference optical signal and the backscattered optical signals to at least one common optical path. Each of the at least one common optical path receives the reference optical signal and at least one of the backscattered optical signals in sequence. The system comprises a detector coupled to the at least one switch via the at least one common optical path and configured to detect the reference optical signal and the backscattered optical signals received from the at least one switch. The system comprises at least one processor coupled to the detector. The at least one processor is configured to determine at least one parameter based on the reference optical signal and the backscattered optical signals.

In yet another embodiment, a method is disclosed. The method comprises generating a reference optical signal. The method comprises transmitting the reference optical signal external to a vehicle in a plurality of directions. The method comprises receiving a plurality of backscattered optical signals. The method comprises outputting one of the reference optical signal and at least one of the plurality of backscattered optical signals to at least one common optical path at a time. The method comprises determining an extent of systematic bias associated with the at least one common optical path. The method comprises determining at least one parameter compensated for the extent of systematic bias associated with the at least one common optical path.

Other embodiments are also disclosed, as subsequently described.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as subsequently described below and in the context of the detailed description.

Figure 1:
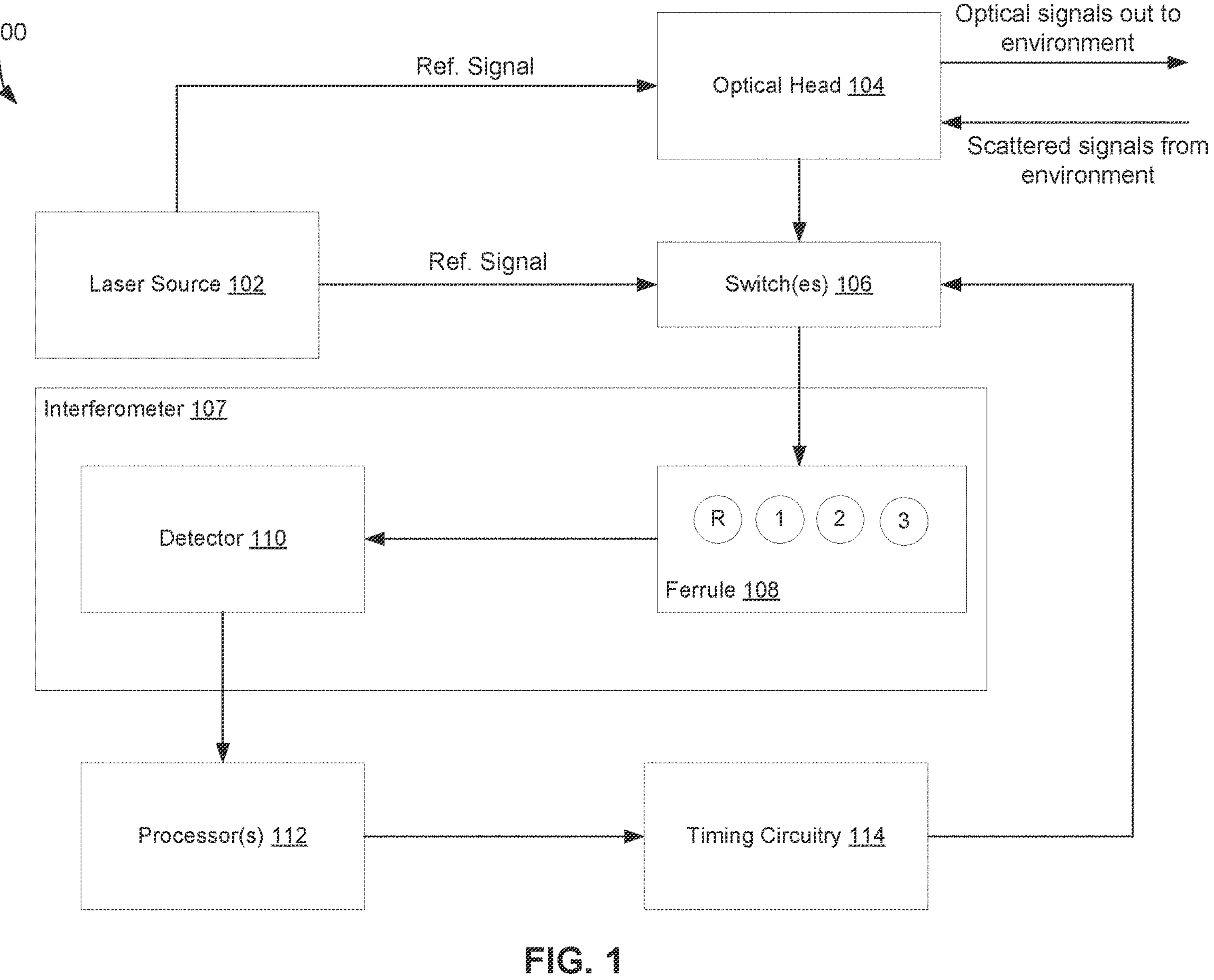
FIG. 1 depicts a block diagram of a system configured for air data sensing, as described in one or more embodiments.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present disclosure utilize time multiplexing of optical channels when transporting optical signals to one or more channels of a ferrule. In doing so, systematic biases in the lidar sensor can be compensated for and even reduced in lidar sensor operation. Consequently, embodiments of the present disclosure improve the accuracy and reliability of sensor measurements during vehicle maneuvering.

FIG. 1 depicts a block diagram of a system 100 configured for air data sensing in which embodiments of the present disclosure can be implemented. System 100 is in some embodiments a lidar sensor. System 100 may comprise other components and/or couple to other systems not explicitly shown in FIG. 1.

Although not explicitly shown, system 100 is configured to be coupled, e.g., affixed to a vehicle. Use of the term "vehicle" is not intended to be limiting and includes all classes of vehicles falling within the ordinary meaning of the term. This would include but not limited to, aerial traversing vehicles (e.g., commercial, non-commercial, or recreational aircraft), unmanned and/or space traversing vehicles (e.g., satellites, urban air mobility vehicles), water traversing vehicles (e.g., ships, submarines), and land traversing vehicles (e.g., automobiles including cars, trucks, motorcycles). Throughout the disclosure, the vehicle may be further illustrated as an aircraft with the understanding that the principles described herein apply to other vehicles where applicable.

System 100 includes a laser source 102 configured to generate optical signals. Laser source 102 can be any kind of light source generator, including any kind of laser. Laser source 102 is coupled to an optical head 104 and at least one optical switch 106, for example, via one or more optical fibers. The optical signals generated by laser source 102 are referred to as reference signals, because they serve as the reference for analyzing backscattered signals received from optical head 104. The parameters of the reference signals, including the frequency/wavelength, optical power, etc., are known by processor 112.

Optical head 104 receives the reference signals from laser source 102. Optical head 104 is configured to transmit the reference signals external to the system 100 (i.e., external to the vehicle) in a plurality of directions. For example, optical head 104 includes guided optics (waveguides, beam splitters, reflectors, etc.) that separate the reference signal into components and directs each component to a different optical port of optical head 104. Each optical port can be positioned at a part of the vehicle to construct a complete representation of a desired parameter. For example, in the case of velocity, each optical port of optical head 104 is positioned differently to measure an x, y, and z component of the velocity of the vehicle.

Optical head 104 acts as an optical transceiver that both transmits the reference signal at each optical port and receives backscattered optical signals that correspond to the reference signal. Initially, optical head 104 transmits the reference signal from each optical port into the surrounding atmosphere. Optical head 104 then subsequently receives optical signals that correspond to the light that was backscattered from the atmosphere. The differences between the reference signal and the backscattered signals can be used to determine environmental and/or navigation parameters.

System 100 includes an interferometer 107 comprising a ferrule 108 coupled to a detector 110. Interferometer 107 is generally configured for detecting the optical path length difference between the reference signal and each of the backscattered signals received from optical head 104. Ferrule 108 includes at least one optical channel that receives the reference and backscattered signals. Each optical channel can be represented as an optical fiber or other waveguide that enables propagation of the reference and backscattered optical signals to detector 110. As shown in FIG. 1, ferrule 108 includes four optical channels: channel R (which carries the reference signal), channel 1 (which carries a first backscattered signal), channel 2 (which carries a second backscattered signal), and channel 3 (which carries a third backscattered signal); however, ferrule 108 can include more or fewer channels (including one channel).

Ferrule 108 provides to detector 110, via each of its associated channels, the reference signal and each backscattered signal. Detector 110 detects the interference between the reference signal and the backscattered signals, which can be represented as an interference pattern of fringes depending on the extent of constructive or destructive interference present in the superimposed signal. Such an interference pattern may vary in characteristics based on the position of each channel in ferrule 108, the optics (e.g., lenses, filters, etc.) used for providing the interference pattern to the detector, and the optical imaging of detector 110. For example, detector 110 can receive the output from each optical channel simultaneously, with the interference pattern between the reference signal and the backscattered optical signal corresponding to each channel projected at a different position of the camera of detector 110. A representation of the interference pattern is provided from detector 110 to one or more processors 112 (described as a single processor for pedagogical explanation). In some embodiments, detector 110 is configured to convert the optical interference pattern to a corresponding electrical signal based on the optical power of the interference pattern. Processor 112 then uses the electrical signal to determine one or more environmental and/or navigation parameters of the vehicle. These parameters can be conveyed to other systems onboard the vehicle and/or to the vehicle operator for use in maneuvering.

In some lidar sensors, the reference signal is provided to ferule 108 on an optical channel separate from the optical channels used to transport the backscattered signals. This is done as a way to avoid contaminating the reference signal with the backscattered signals before superposition to detector 110. However, the characteristics of the backscattered signals can be altered due to propagation in the optical channels as a result of imperfections in the optical channels. The resultant systematic bias is difficult to detect because it is perceived by detector 110 as characteristic of the backscattered signals, and difficult to accommodate because it is inherent to the properties of the optical channels. For example, the properties of the optical channels and any other optics may change with time or environment (e.g., pressure, temperature, vibration, etc.), and typically vary strongest in the low-frequency regime. Because both the reference and backscattered optical channels are spatially separated, variations in these properties may induce significant systematic bias in the sensor.

To compensate for, and in some cases reduce systematic bias present in optical signal transmission, system 100 includes at least one switch 106 coupled in between optical head 104 and the ferrule 108. Switch 106 is configured to output one of the reference signal and a backscattered signal (and optionally a separate reference signal) at a time into one or more optical channels of the ferrule 108. In some embodiments, switch 106 is represented as a plurality of optical switches in a switch array. Alternatively, switch 106 can be implemented as a single optical switch. Various embodiments of switch 106 are shown and described with respect to FIGS. 2-8.

System 100 is configured to time-multiplex the reference signal with each of the backscattered signals on at least one common optical path (e.g., the same optical channel) based on the configuration of switch 106. As used herein, a "common optical path" refers to an optical path coupled between the optical head and the interferometer detector, with the common optical path configured to receive the reference optical signal and at least one backscattered signal at different periods of time. In time-multiplexing the reference signal on the same optical channel as used to transport the backscattered signal, the extent of systematic bias can be determined by processor 112 and compensated for when determining environmental parameters. The configuration of switch 106 is set by timing circuitry 114. For example, timing circuitry 114 is configured to send control signals that configure switch 106 to output either the reference signal or a backscattered signal for a given optical channel. After a set time interval, timing circuitry 114 configures switch 106 to change the output configuration to output a different optical signal to the same optical channel of ferrule 108. The duration of the timing for each of the switch configurations is determined by timing circuitry 114 based on data provided by processor 112. In some embodiments, timing circuitry 114 can be integrated with processor 112.

Figure 2:
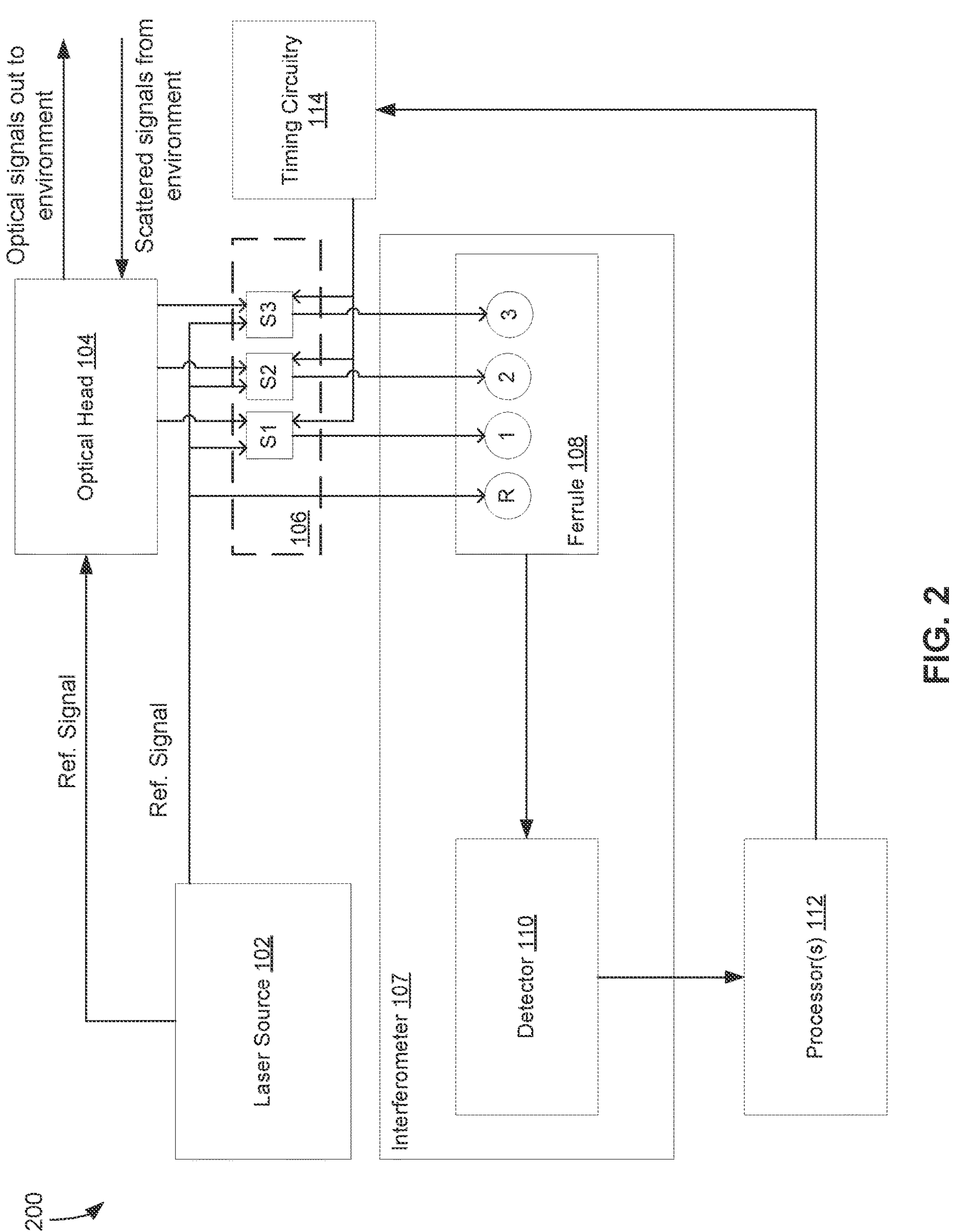
FIG. 2 depicts a block diagram of the system of FIG. 1 with three switches coupled to a four-channel ferrule, as described in one or more embodiments.

FIGS. 2-8 depict various embodiments of time multiplexing of optical signals for at least one optical channel. Referring to FIG. 2, switch 106 includes three optical switches S1, S2, and S2, each of which are respectively coupled to channels 1, 2, and 3 of ferrule 108. Switch 106 is configured to receive both the reference signal from laser source 102 as well as the backscattered signals from optical head 104. Specifically, S1 receives the reference signal along with a first backscattered signal, S2 receives the reference signal along with a second backscattered signal, and S3 receives the reference signal along with a third backscattered signal. In the embodiment of FIG. 2, ferrule 108 includes a separate reference channel R which receives only the reference signal from laser source 102. In this embodiment, switch 106 is configured to output the reference signal to optical channel R regardless of the output to optical channels 1, 2, and 3.

Switch S1 is configured to receive both the reference signal and the first backscattered signal and, based on the control from timing circuitry 114, is configured to output one of the reference signal and the first backscattered signal to optical channel 1 of ferrule 108. In a first configuration, timing circuitry 114 sets switch S1 to output the reference signal to optical channel 1 of ferrule 108. In a second configuration, timing circuitry 114 sets switch S1 to output the first backscattered signal to optical channel 1 of ferrule 108.

Switch S2 is configured to receive both the reference signal and the second backscattered signal and, based on the control from timing circuitry 114, is configured to output one of the reference signal and the second backscattered signal to optical channel 2 of ferrule 108. In a first configuration, timing circuitry 114 sets switch S2 to output the reference signal to optical channel 2 of ferrule 108. In a second configuration, timing circuitry 114 sets switch S2 to output the second backscattered signal to optical channel 2 of ferrule 108.

Switch S3 is configured to receive both the reference signal and the third backscattered signal and, based on the control from timing circuitry 114, is configured to output one of the reference signal and the third backscattered signal to optical channel 3 of ferrule 108. In a first configuration, timing circuitry 114 sets switch S3 to output the reference signal to optical channel 3 of ferrule 108. In a second configuration, timing circuitry 114 sets switch S3 to output the third backscattered signal to optical channel 3 of ferrule 108. The switching rate should preferably be set higher than the known temporal variation of the systematic bias of the optical channels of the ferrule 108. In some embodiments, the switching is performed for each channel simultaneously, but can also switch each corresponding switch to a receiving optical channel in sequence.

While optical channel R provides the reference signal to detector 110, optical channels 1, 2, and 3 are configured to provide either the reference signal or the respective first, second, and third backscattered signal to detector 110, depending on the output of switch 106. In this embodiment, optical channels 1, 2, and 3 comprise the common optical paths. Accordingly, detector 110 receives either the reference signal or the respective backscattered signals from optical channels 1, 2, and 3 at a given time. Because the reference signal is expected to be identical between each of the channels R, 1, 2, and 3, the disparity between the reference signal in each of channels 1, 2, and 3 can be compared with the reference signal from channel R to determine the extent of systematic bias for a given optical channel. For example, if the optical path length of the reference signal corresponding to channel 1 is different than the optical path length of the reference signal of channel R, then channel 1 likely suffers from some systematic bias, the extent of which can be determined by processor 112 based on the difference in optical path length as detected by detector 110. Processor 112 can then factor in the extent of systematic bias (as represented by the optical path difference, phase difference, or other parameter) when determining environmental and/or navigation parameters of the vehicle.

In some embodiments, processor 112 determines the velocity of the vehicle based on the outputs of each of the optical channels, which can be done using velocimetry processing techniques. For example, the velocity component in each direction can be determined based on each of the outputs of optical channels 1, 2, and 3 as follows:

$$\text{OUT1} = Ref - S1 - \Delta R1 \qquad \text{Equation 1(a)}$$

$$\text{OUT2} = Ref - S2 - \Delta R2 \qquad \text{Equation 1(b)}$$

$$\text{OUT3} = Ref - S3 - \Delta R3 \qquad \text{Equation 1(c)}$$

where Ref is the reference signal from optical channel R, S1 is the backscattered signal from optical channel 1, and ΔR1 is the optical path difference in the reference signal from optical channel R and optical channel 1. The other quantities relating to the outputs of channel 2 (OUT2) and 3 (OUT3) are defined in a similar manner, as shown with respect to Equations 1(b)-(c). Hence, the extent of systematic error for each channel is quantitatively represented as ΔR, which is used by processor 112 to determine corrected environmental and/or navigation parameters of the vehicle.

Figure 3:
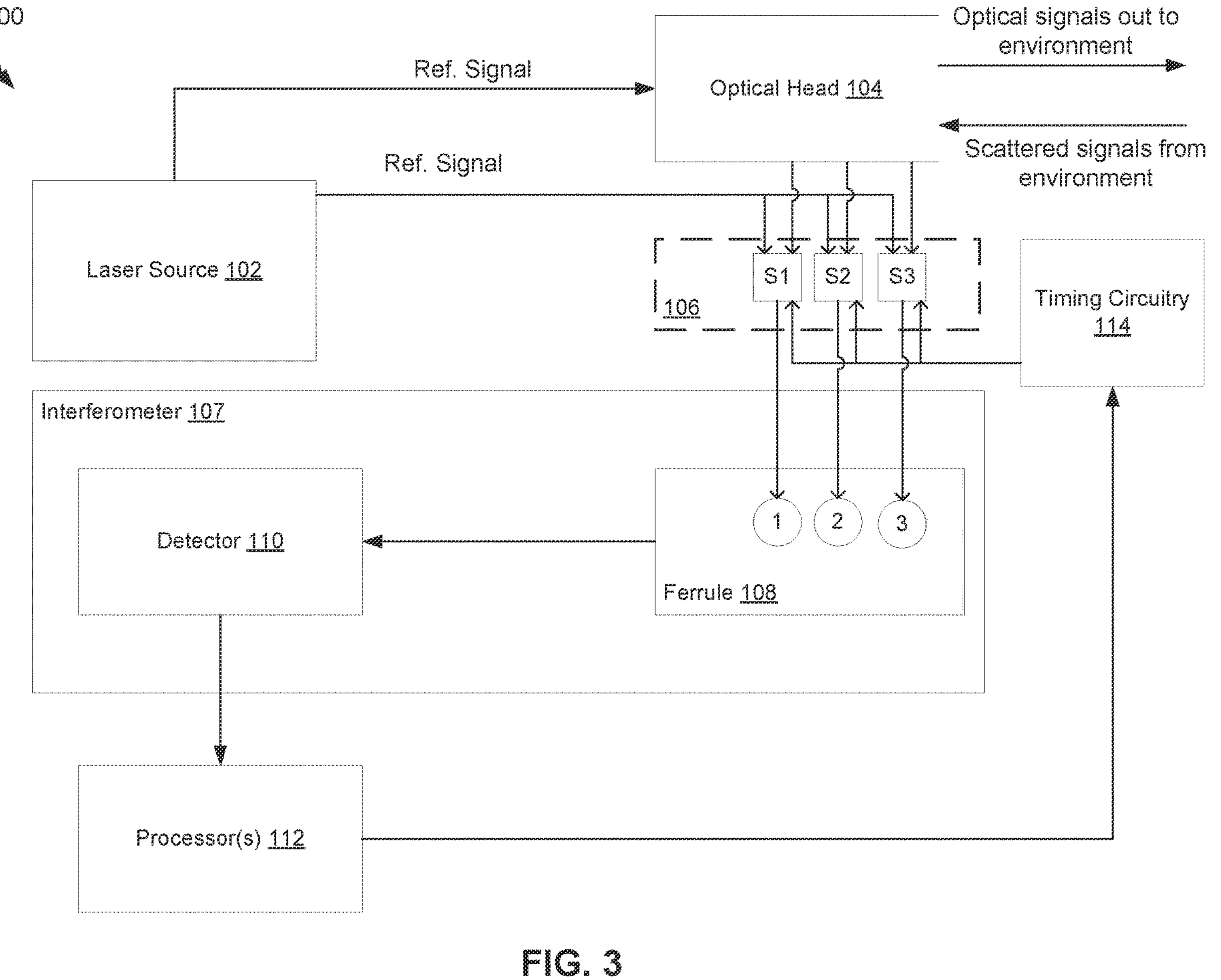
FIG. 3 depicts a block diagram of the system of FIG. 1 with three switches coupled to a three-channel ferrule, as described in one or more embodiments.

Alternative embodiments of switch 106 and ferrule 108 can also be used, such as system 300 shown in FIG. 3. System 300 operates identically as described with respect to FIGS. 1-2 except as otherwise described. In FIG. 3, system 300 includes a switching array 106 with three optical switches S1, S2, S3 similarly as described with respect to system 200. However, unlike system 200, ferrule 108 does not include a separate reference channel. Instead, the reference signal is provided to ferrule 108 via each switch S1, S2, S3. Similarly as described with respect to FIG. 2, switches S1, S2, and S3 are configured to output either the reference signal from laser source 102 or the respective first (S1), second (S2), and third (S3) backscattered signal to respective optical channel 1 (S1), optical channel 2 (S2), and optical channel 3 (S3) of ferrule 108. In this embodiment, the common optical paths are represented by optical channels 1, 2, and 3. The switching rate to change each of the switches S1, S2, and S3 to different configurations is suitably set by timing circuitry 114. In some embodiments, the switching rate for each switch is higher than the switching rate of system 200 to accommodate the lack of a separate reference optical channel R.

To determine the output of each ferrule 108, processor 112 can determine the relative systematic bias present between the optical channels 1, 2, and 3. For example, optical channel 1 can be designated the reference channel. In this example, the relative optical path length difference between the reference signal output from optical channel 1 and optical channel 2 can be used to determine the optical path length difference ΔR for channels 1 and 2, while the optical path length difference between the reference signal output from optical channel 1 and optical channel 3 can be used to determine the optical path length difference ΔR for optical channel 3. To determine the systematic bias for optical channel 1, the output of the reference channel can be compared between two successive switching periods.

Figure 4:
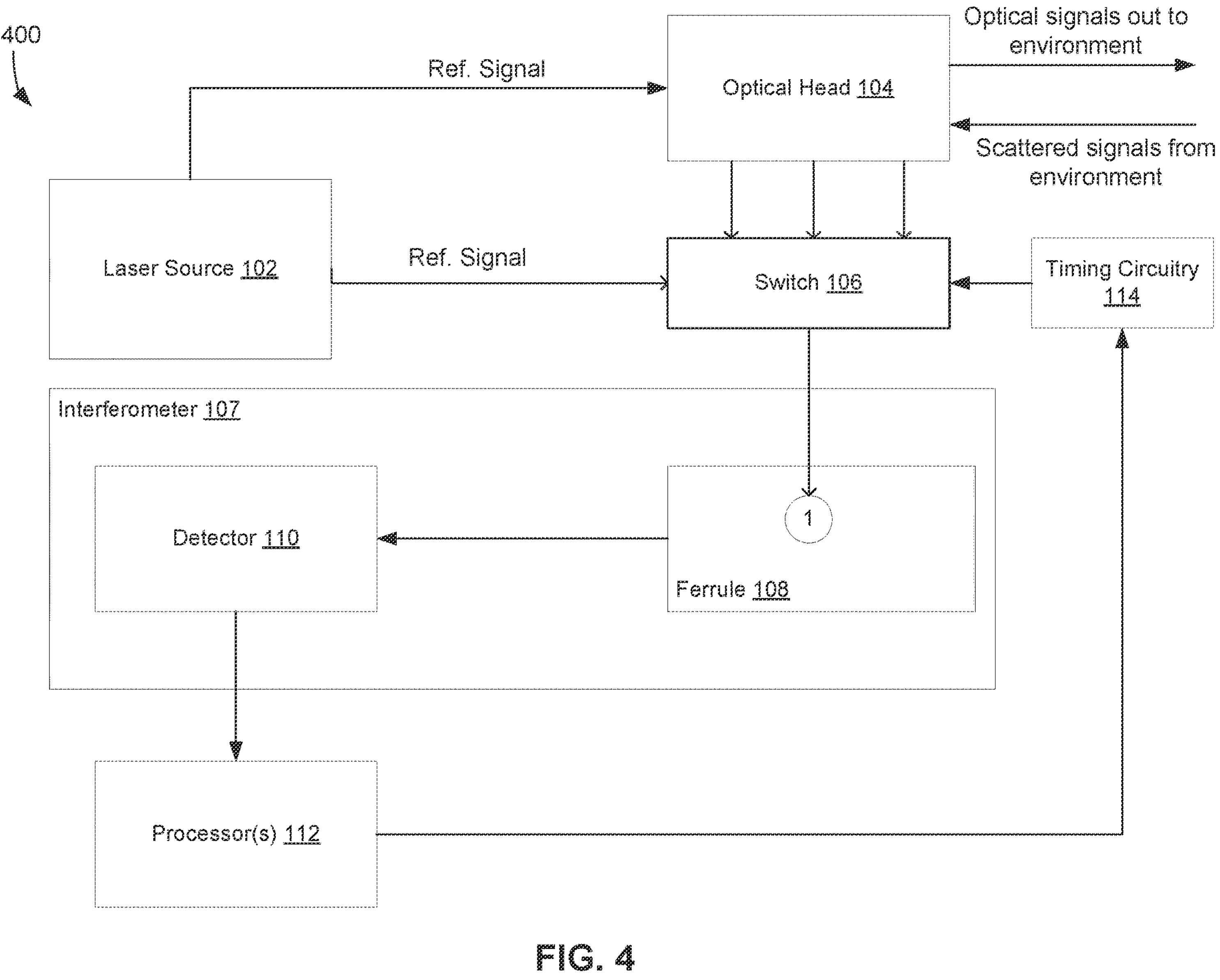
FIG. 4 depicts a block diagram of the system of FIG. 1 with a single switch coupled to a single-channel ferrule, as described in one or more embodiments.

FIG. 4 depicts an exemplary embodiment of system 100 shown and described with respect to FIG. 1. In the embodiment of FIG. 4, system 400 includes a single switch 106 and ferrule 108 includes a single optical channel 1. Switch 106 is configured to receive the reference signal from laser source 102 and each of the backscattered signal components from optical head 104. In this embodiment, switch 106 is configured to output one of the reference signal, the first backscattered signal, the second backscattered signal, and the third backscattered signal to the same optical channel 1 at a time. That is, switch 106 is configured to switch between outputting each of the four optical signals. In this embodiment, the common optical path is denoted as optical channel 1. The switching rate is appropriately set by timing circuitry 114. In some embodiments, the switching rate is higher than the switching rate of the switches 106 described with respect to FIGS. 2-3.

Ferrule 108 is configured to provide one of the reference signal, the first backscattered signal, the second backscattered signal, and the third backscattered signal at a time to detector 110 via optical channel 1. Processor 112 is configured to determine the extent of systematic bias of optical channel 1 based on the reference signal output to detector 110. Additionally, processor 112 is configured to determine environmental and/or navigation parameters based on the backscattered signal components, as previously described. The embodiment of FIG. 4 can reduce systematic bias by time-multiplexing each of the optical signals on the same optical channel. By including a single optical channel, the signal projected to detector 110 can occupy the entire detector camera, which can improve identification of the interferometric pattern and subsequent data processing by processor 112.

Figure 5:
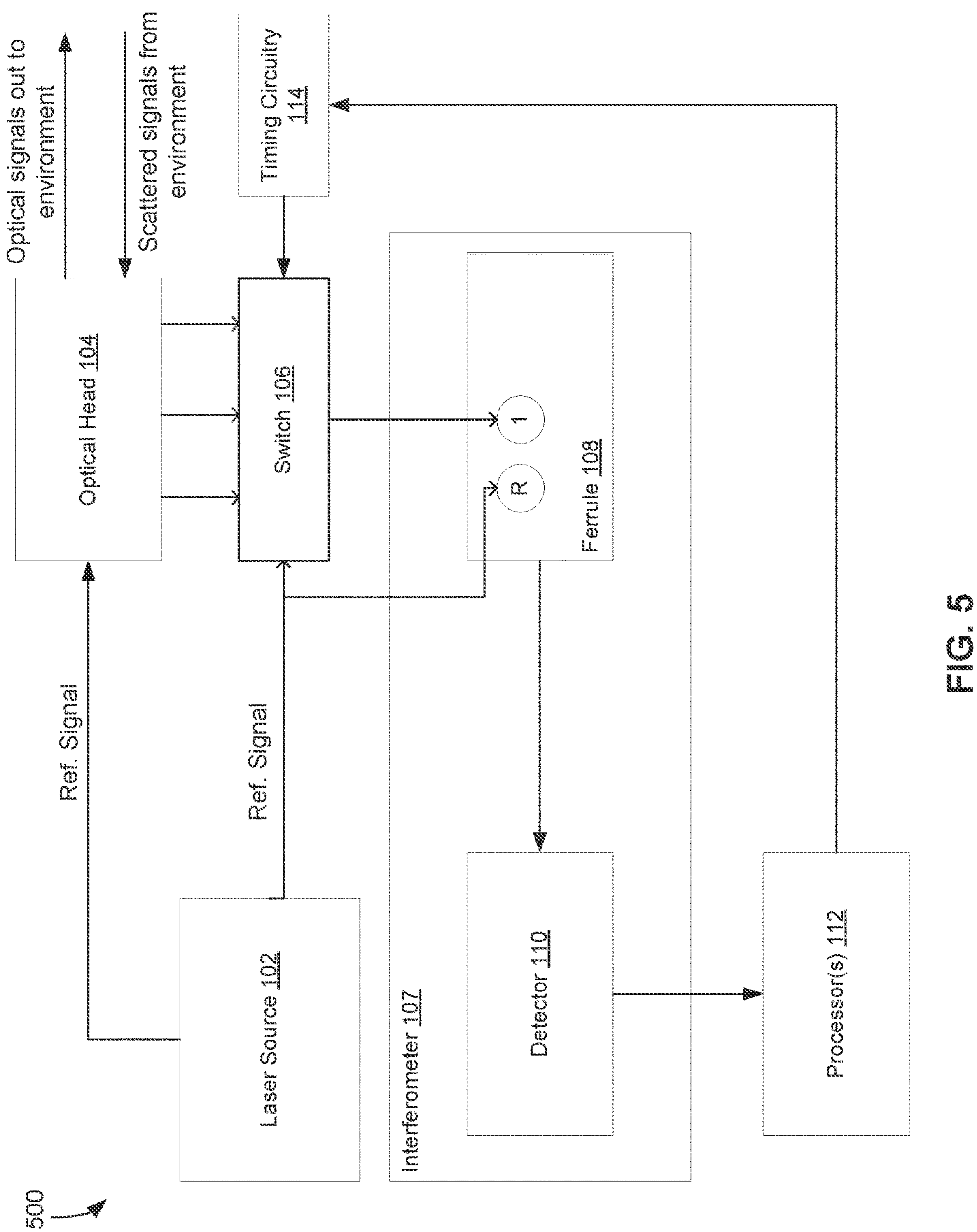
FIG. 5 depicts a block diagram of the system of FIG. 1 with a single switch coupled to a dual-channel ferrule, as described in one or more embodiments.

FIG. 5 depicts an exemplary embodiment of the system shown in FIG. 1, and an alternative embodiment to system 400 as shown in FIG. 4. System 500 operates similarly as described to system 400 except as further described. In this embodiment, ferrule 108 includes two optical channels, optical channel R and optical channel 1. Optical channel R receives the reference signal from laser source 102. Additionally, optical channel 1 receives one of the reference signal, the first backscattered signal, the second backscattered signal, and the third backscattered signal at a time, based on the configuration of switch 106. In this embodiment, the common optical path is denoted by optical channel 1. Ferrule 108 provides the reference signal from optical channel R and the optical signal from optical channel 1 to detector 110. Processor 112 then determines the extent of systematic bias based on the phase difference between the reference signal provided from reference channel R and the reference signal provided from optical channel 1. Processor 112 can then compensate for systematic bias present in ferrule 108 by determining one or more environmental and/or navigation parameters (or components thereof) based on the extent of systematic bias. In this embodiment, the switching rate can be relaxed relative to the switching rate in the embodiment shown in FIG. 4.

Figure 6:
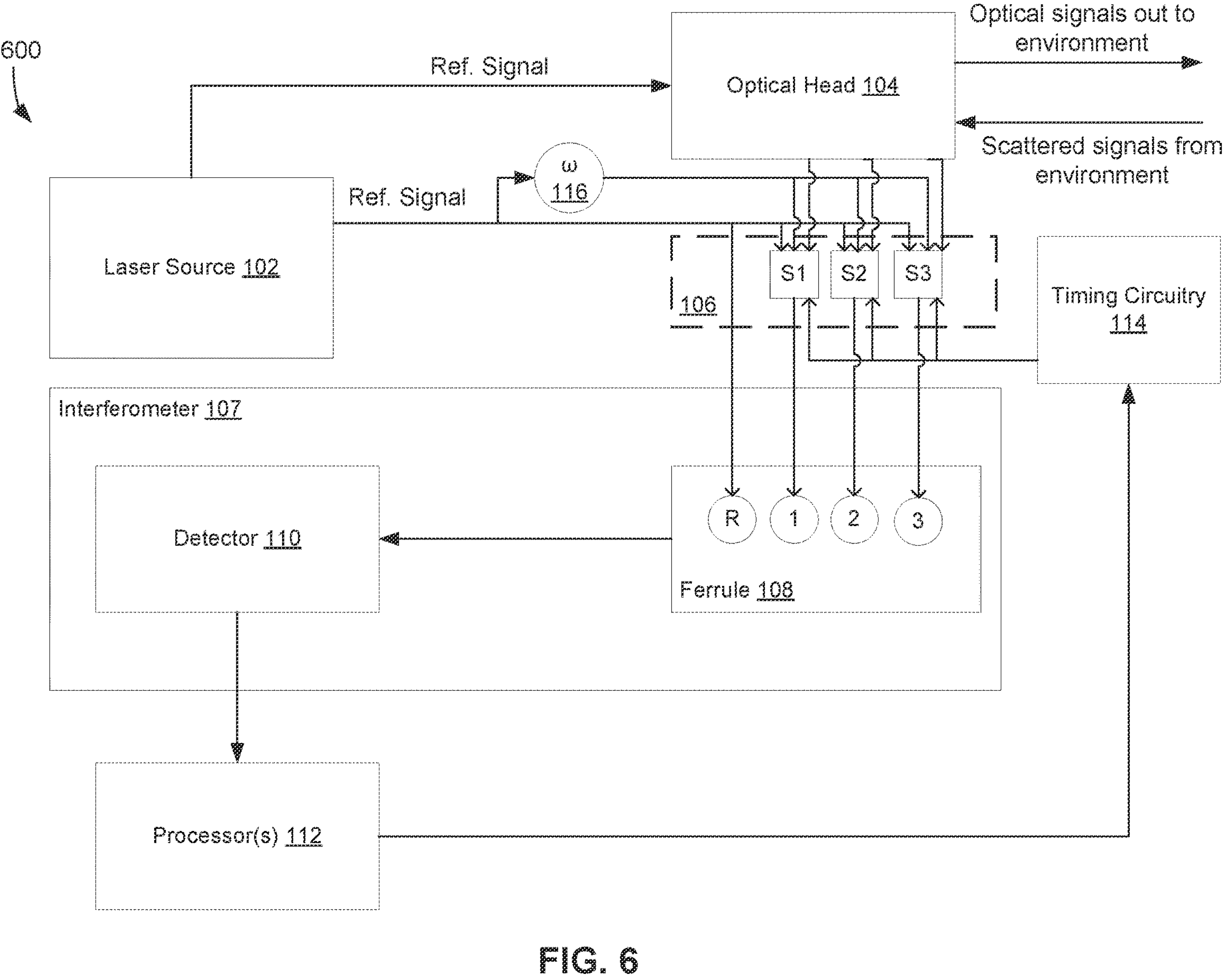
FIG. 6 depicts a block diagram of a system including a frequency shifter and three switches coupled to a four-channel ferrule, as described in one or more embodiments.

FIG. 6 depicts another exemplary embodiment of system 100 shown and described with respect to FIG. 1. System 600 operates similarly as described with respect to system 100 with additional features as further described. In the embodiment of FIG. 6, laser source 102 is coupled to a frequency shifter 116, which is configured to receive the reference optical signal and generate a known frequency-shifted reference signal that is provided to switching array 106. For example, frequency shifter 116 can generate a Doppler-shifted signal based on a defined phase shift, which can be a fixed frequency shift.

In this embodiment, ferrule 108 comprises three optical channels each respectively coupled to a switch S1, S2, S3. Each switch is configured to output one of the reference signal from laser source 102, the Doppler-shifted signal from frequency shifter 116, and a respective backscattered signal from optical head 104. For example, S1 is configured to receive the reference signal from laser source 102, the Doppler-shifted signal from frequency shifter 116, and the first backscattered signal from optical head 104. S1 then outputs one of these signals to optical channel 1 of ferrule 108 at a time depending on the configuration set by timing circuitry 114. Switches S2 and S3 operate in a similar manner. Ferrule 108 also includes a reference optical channel R configured to receive the reference optical signal from laser source 102. In this embodiment, optical channels 1, 2, and 3 comprise the common optical paths.

To account for systematic bias ΔR, processor 112 can determine a compensated output corresponding to each optical channel that is indicative of a component of an environmental and/or navigation parameter. For example, focusing on the output from optical channel 1, the systematic bias ΔR1 can be determined from the equation ΔR1=Ref−R1, where Ref is the optical path length of optical channel R and R1 is the optical path length of the reference signal for optical channel 1. The output from each optical channel can be demodulated by a scale factor determined based on the frequency shift generated by frequency shifter 116. In the case of optical channel 1, the scale factor can be determined by the equation SF=(Ref−DoppR1)/ω, where DoppR1 is the optical path length of optical channel 1 when the Doppler-shifted reference signal is the output, and ω is the frequency shift. Therefore, the compensated output corresponding to optical channel 1 can be determined as follows:

$$\mathrm{OUT1} = (Ref - S1 - \Delta R1) * SF \qquad \text{Equation 2}$$

The outputs for the other optical channels 2 and 3 can be determined in a similar manner.

Figure 7:
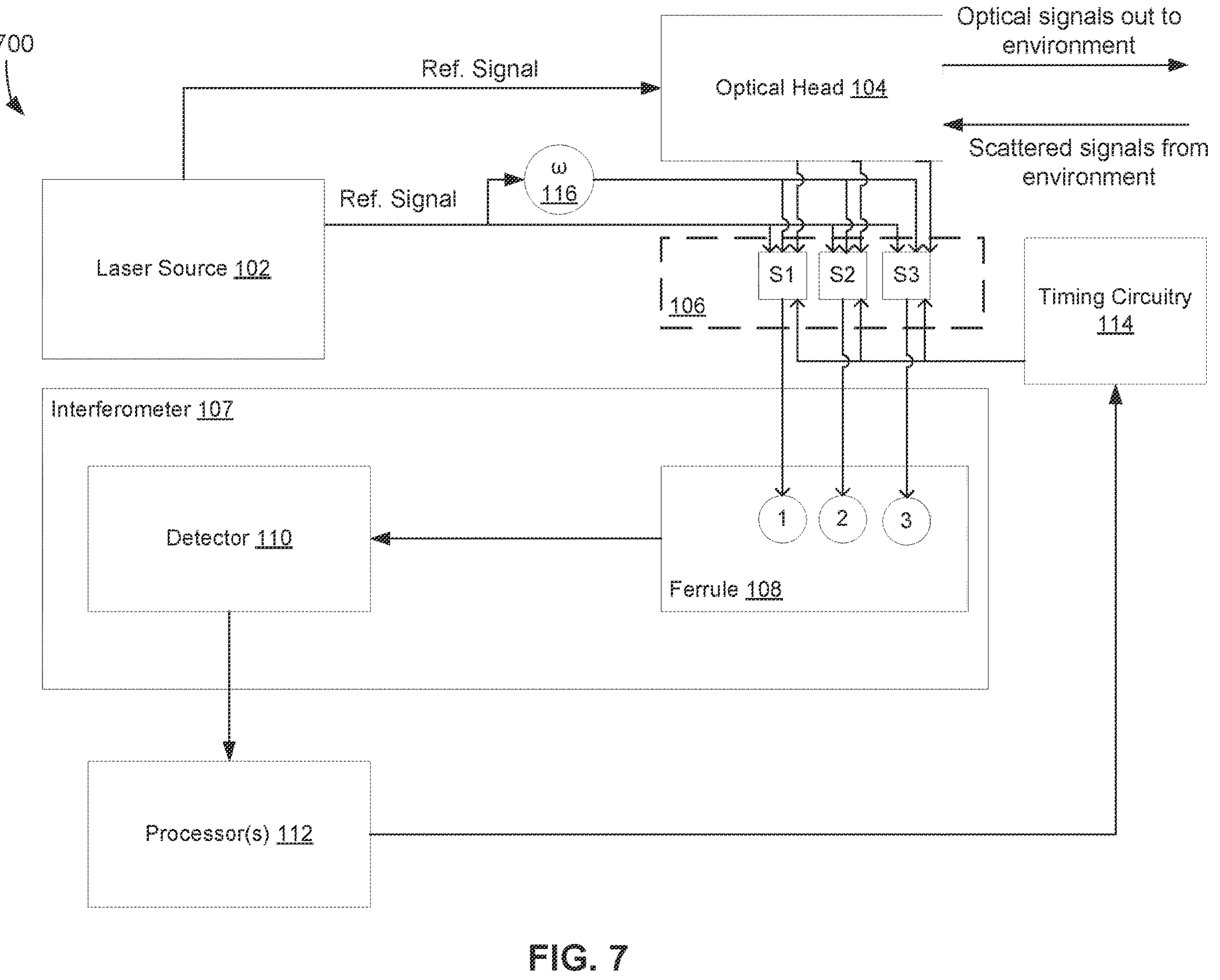
FIG. 7 depicts a block diagram of a system including a frequency shifter and three switches coupled to a three-channel ferrule, as described in one or more embodiments.

FIG. 7 depicts an exemplary embodiment of the system shown in FIG. 1, and an alternative embodiment to system 600 as shown in FIG. 6. System 700 operates similarly as described to system 600 except as further described. In this embodiment, ferrule 108 comprises three optical channels 1, 2, 3 each respectively coupled to switch S1, S2, S3. In contrast to FIG. 6, ferrule 108 does not include a separate optical channel R for the reference optical signal. The reference optical signal, along with the Doppler-shifted signal from frequency shifter 116, is respectively distributed to each switch S1, S2, S3. As previously described, each switch S1, S2, S3 is configured to output one of the reference optical signal from laser source 102, the Doppler-shifted signal from frequency shifter 116, and a respective backscattered signal at a time to a corresponding optical channel. In this embodiment, optical channels 1, 2, and 3 comprise the common optical paths.

Figure 8:
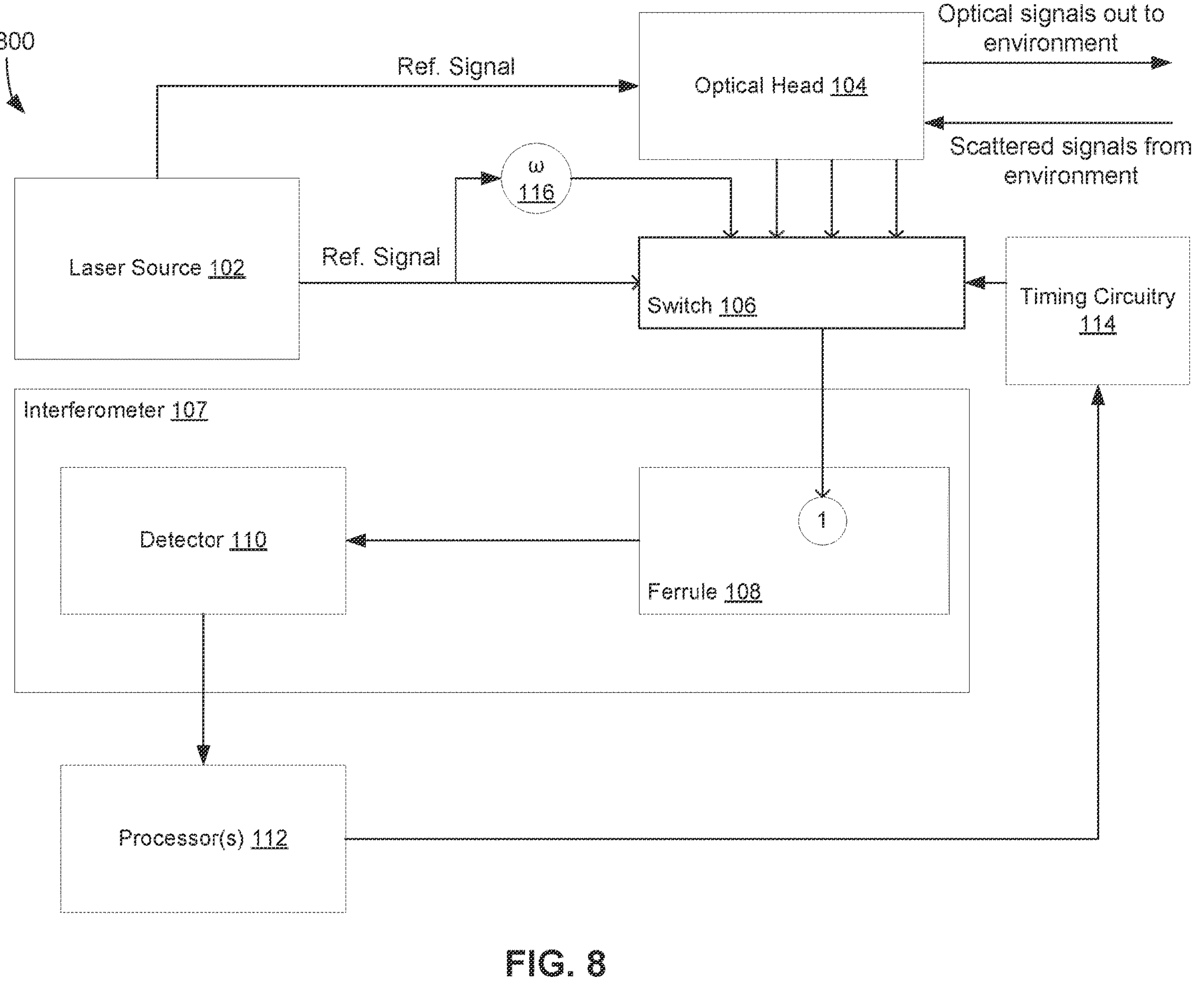
FIG. 8 depicts a block diagram of a system including a frequency shifter and a single switch coupled to a single-channel ferrule, as described in one or more embodiments.

FIG. 8 depicts an exemplary embodiment of the system shown in FIG. 1, and an alternative embodiment to systems 600-700 as shown in FIGS. 6-7. System 800 operates similarly as described to systems 600-700 except as further described. In this embodiment, ferrule 108 comprises only one optical channel 1 and a single switch 106. Switch 106 is configured to receive the reference optical signal from laser source 102, the Doppler-shifted signal from frequency shifter 116, and each backscattered signal from optical head 104. Switch 106 outputs one of the reference optical signal, the Doppler-shifted signal, and each backscattered signal to optical channel 1 at a time. Each of these signals are subsequently detected by detector 110 and used for both determination of the systematic bias in optical channel 1 as well as for determining one or more environmental and/or navigation parameters adjusted for the determined systematic bias. In this embodiment, the common optical path is denoted by optical channel 1.

While FIGS. 1-8 describe switching in the context of three backscattered signals, any number of backscattered signals can be used. Additionally, any number of optical channels and switches can be used.

Figure 9:
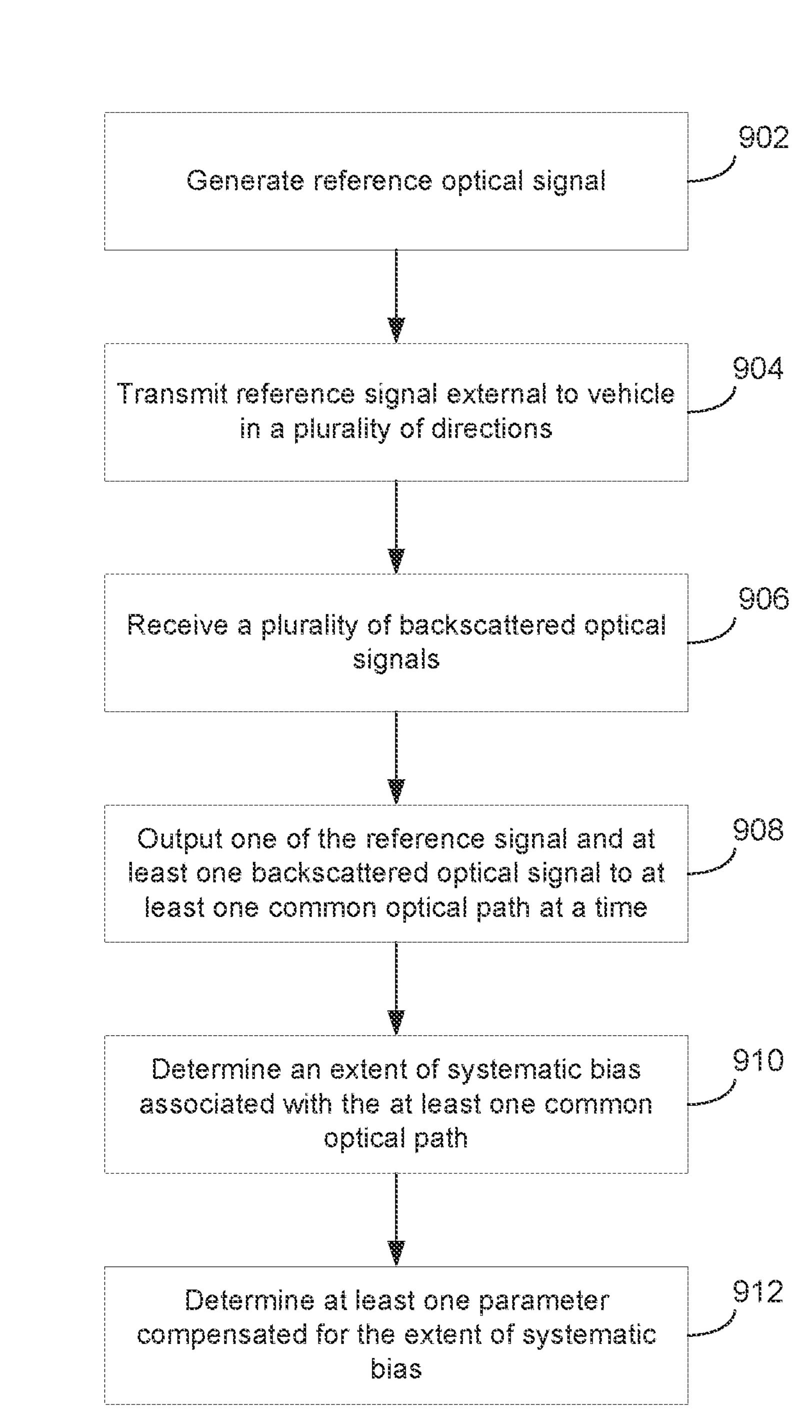
FIG. 9 depicts a flow diagram of a method for time-multiplexing optical channels, as described in one or more embodiments.

FIG. 9 depicts a flow diagram of a method 900 for time-multiplexing optical channels. Method 900 may be implemented via the techniques described with respect to FIGS. 1-8, but may be implemented via other techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 900 includes generating a reference optical signal at block 902, for example, by the laser source 102 or other light source. At block 904, method 900 transmits the reference optical signal external to a vehicle in a plurality of directions. In some embodiments, the reference optical signal is transmitted in three directions that correspond to a representation of a three-dimensional coordinate system; however, any number of directions can be used. This can be performed by optical head 104 or other optical transceiver. Method 900 then proceeds to block 906 and receives a plurality of backscattered signals. Three backscattered signals are shown and described with respect to FIGS. 1-8 but any number of such signals can be used.

Method 900 outputs one of the reference optical signal and each backscattered signal to at least one common optical path at block 908. This function can be performed by one or more optical switches, including any of the switches or switch arrays described in FIGS. 1-8. The output of each signal is done one at a time in a time-multiplexed fashion to the at least one common optical path. For example, the at least one common optical path can be a single optical channel of a ferrule or can be a plurality of optical channels of a ferrule. Where a plurality of optical channels are used, each backscattered signal can be respectively output to one of the plurality of optical channels, along with the reference optical signal. For example, if three optical channels are used, a first optical channel can receive a first backscattered signal, a second optical channel can receive a second backscattered signal, and a third optical channel can receive a third backscattered signal, with each optical channel also configured to receive the reference optical signal. However, in some embodiments, some backscattered signals may be received on the same optical channel, along with the reference optical signal, one at a time. Optionally, a Doppler-shifted reference signal can be output in sequence along with the other signals described.

Proceeding to block 910, method 900 determines an extent of systematic bias associated with the at least one common optical path. Such systematic bias can be representative, for example, as an optical path difference or phase difference between the reference signal output at a first optical channel and the reference signal output at a second optical channel. In some embodiments, the first optical channel is a channel dedicated to receiving the reference optical signal. In some embodiments, systematic bias can be determined by the reference signal output from a single optical channel, for a sufficiently high switching rate.

At block 912, method 900 determines at least one parameter compensated for the extent of systematic bias. The at least one parameter can be an environmental parameter, a navigation parameter, or a component thereof. Where a Doppler-shifted reference signal is used, the at least one parameter can be determined by utilizing an appropriate scale factor along with the extent of systematic bias for each optical channel.

The methods and techniques described herein may be implemented at least in part in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as erasable programmable read-only memory (EPROM), electrically-erasable programmable read-only memory (EEPROM), and flash memory devices; magnetic disks such as internal hard disks and removable disks; magneto-optical disks; and the like. Any of the foregoing may be supplemented by, or incorporated in, specially-designed application specific integrated circuits (ASICs).

EXAMPLE EMBODIMENTS

Example 1 includes an air data sensor, comprising: a light source configured to generate a reference optical signal; an optical transceiver coupled to the light source, wherein the optical transceiver is configured to transmit the reference optical signal external to the air data sensor in a plurality of directions, and in response to receive backscattered optical signals from each of the plurality of directions; at least one switch coupled to the optical transceiver, wherein the at least one switch is configured to output the reference optical signal and at least one of the backscattered optical signals to at least one common optical path, wherein in a first configuration the at least one switch is configured to output the reference optical signal to the at least one common optical path, wherein in a second configuration, the at least one switch is configured to output the at least one of the backscattered optical signals to the at least one common optical path; a detector coupled to the at least one switch via the at least one common optical path and configured to detect the reference optical signal and the backscattered optical signals received from the at least one switch; and at least one processor coupled to the detector and the at least one switch, wherein the at least one processor is configured to receive the reference optical signal and the backscattered optical signals, and to set the at least one switch in the first configuration or the second configuration.

Example 2 includes the air data sensor of Example 1, wherein the at least one common optical path comprises at least one optical channel of a ferrule.

Example 3 includes the air data sensor of any of Examples 1-2, wherein the at least one common optical path comprises a single common optical path, wherein the at least one switch is configured to output the reference optical signal in the first configuration, wherein the at least one switch is configured to output each backscattered optical signal to the single common optical path in a respective distinct configuration.

Example 4 includes the air data sensor of any of Examples 1-3, wherein the at least one common optical path comprises a first common optical path and a second common optical path, wherein the at least one switch is configured to output the reference optical signal to the first common optical path and the second common optical path in the first configuration, wherein the at least one switch is configured to output a first backscattered optical signal to the first common optical path and a second backscattered optical signal to the second common optical path in the second configuration.

Example 5 includes the air data sensor of any of Examples 1-4, wherein the at least one common optical path is part of a ferrule, wherein the ferrule comprises a reference optical channel, wherein the at least one switch is configured to output the reference optical signal to the reference optical channel in the first and/or second configurations.

Example 6 includes the air data sensor of any of Examples 1-5, further comprising a frequency shifter coupled to the at least one switch, wherein the frequency shifter is configured to generate a Doppler-shifted reference signal, wherein the at least one switch is configured to output the Doppler-shifted reference signal to the at least one common optical path in a third configuration.

Example 7 includes the air data sensor of any of Examples 1-6, wherein the at least one switch comprises a plurality of switches, wherein a first switch of the plurality of switches is configured to output the reference optical signal and a first backscattered optical signal to a first common optical path, wherein a second switch of the plurality of switches is configured to output the reference optical signal and a second backscattered optical signal to a second common optical path.

Example 8 includes a system, comprising: a light source coupled to a vehicle and configured to generate a reference optical signal; an optical transceiver coupled to the light source, wherein the optical transceiver is configured to transmit the reference optical signal external to the vehicle in a plurality of directions, and in response to receive backscattered optical signals from each of the plurality of directions; at least one switch coupled to the optical transceiver, wherein the at least one switch is configured to output the reference optical signal and the backscattered optical signals to at least one common optical path, wherein each of the at least one common optical path receives the reference optical signal and at least one of the backscattered optical signals in sequence; a detector coupled to the at least one switch via the at least one common optical path and configured to detect the reference optical signal and the backscattered optical signals received from the at least one switch; at least one processor coupled to the detector, wherein the at least one processor is configured to determine at least one parameter based on the reference optical signal and the backscattered optical signals.

Example 9 includes the system of Example 8, wherein the at least one processor is configured to determine an extent of systematic bias with respect to the at least one common optical path, wherein the at least one processor is configured to determine the at least one parameter based on the extent of systematic bias.

Example 10 includes the system of any of Examples 8-9, wherein the at least one common optical path comprises a single optical path, wherein the at least one switch is configured to output the reference optical signal and each of the backscattered optical signals to the single optical path in sequence.

Example 11 includes the system of any of Examples 8-10, wherein the at least one common optical path comprises a first common optical path and a second common optical path, wherein the at least one switch is configured to output the reference optical signal and a first backscattered optical signal to the first common optical path in sequence, wherein the at least one switch is configured to output the reference optical signal and the second backscattered optical signal to the second common optical path in sequence.

Example 12 includes the system of any of Examples 8-11, wherein the at least one common optical path are part of a ferrule, wherein the ferrule comprises a reference optical channel, wherein the at least one switch is configured to output the reference optical signal to the reference optical channel.

Example 13 includes the system of any of Examples 8-12, further comprising a frequency shifter coupled to the at least one switch, wherein the frequency shifter is configured to generate a Doppler-shifted reference signal, wherein the at least one common optical path is configured to receive the Doppler-shifted reference signal in sequence with the reference optical signal and the at least one of the backscattered optical signals.

Example 14 includes the system of any of Examples 9-13, wherein to determine the extent of systematic bias, the at least one processor is configured to determine an optical path length difference or phase difference between the reference optical signal as detected from a first common optical path and the reference optical signal as detected from a reference optical channel.

Example 15 includes the system of any of Examples 9-14, wherein to determine the extent of systematic bias, the at least one processor is configured to determine an optical path length difference or phase difference between the reference optical signal as detected from a common optical path at two different points in time.

Example 16 includes a method, comprising: generating a reference optical signal; transmitting the reference optical signal external to a vehicle in a plurality of directions; receiving a plurality of backscattered optical signals; outputting one of the reference optical signal and at least one of the plurality of backscattered optical signals to at least one common optical path at a time; determining an extent of systematic bias associated with the at least one common optical path; and determining at least one parameter compensated for the extent of systematic bias associated with the at least one common optical path.

Example 17 includes the method of Example 16, wherein outputting one of the reference optical signal and at least one of the plurality of backscattered optical signals comprises: outputting the reference optical signal and a first backscattered optical signal to a first common optical path in sequence; and outputting the reference optical signal and a second backscattered optical signal to a second common optical path in sequence.

Example 18 includes the method of any of Examples 16-17, wherein outputting one of the reference optical signal and at least one of the plurality of backscattered optical signals comprises: outputting the reference optical signal and each of the plurality of backscattered optical signals to a single common optical path in sequence.

Example 19 includes the method of any of Examples 16-18, comprising: outputting the reference optical signal to a reference optical channel distinct from the at least one common optical path.

Example 20 includes the method of any of Examples 16-19, comprising: generating a Doppler-shifted reference optical signal; and outputting the reference optical signal, the Doppler-shifted reference optical signal, and the at least one of the plurality of backscattered optical signals to the at least one common optical path in sequence.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An air data sensor, comprising:

a light source configured to generate a reference optical signal;

an optical transceiver coupled to the light source, wherein the optical transceiver is configured to transmit the reference optical signal external to the air data sensor in a plurality of directions, and in response to receive backscattered optical signals from each of the plurality of directions;

at least one switch coupled to the optical transceiver, wherein the at least one switch is configured to output the reference optical signal and at least one of the backscattered optical signals to at least one common optical path, wherein in a first configuration the at least one switch is configured to output the reference optical signal to the at least one common optical path, wherein in a second configuration, the at least one switch is configured to output the at least one of the backscattered optical signals to the at least one common optical path;

a detector coupled to the at least one switch via the at least one common optical path and configured to detect the reference optical signal and the backscattered optical signals received from the at least one switch; and at least one processor coupled to the detector and the at least one switch, wherein the at least one processor is configured to receive the reference optical signal and the backscattered optical signals, and to set the at least one switch in the first configuration or the second configuration.

2. The air data sensor of claim 1, wherein the at least one common optical path comprises at least one optical channel of a ferrule.

3. The air data sensor of claim 1, wherein the at least one common optical path comprises a single common optical path, wherein the at least one switch is configured to output the reference optical signal in the first configuration, wherein the at least one switch is configured to output each backscattered optical signal to the single common optical path in a respective distinct configuration.

4. The air data sensor of claim 1, wherein the at least one common optical path comprises a first common optical path and a second common optical path, wherein the at least one switch is configured to output the reference optical signal to the first common optical path and the second common optical path in the first configuration, wherein the at least one switch is configured to output a first backscattered optical signal to the first common optical path and a second backscattered optical signal to the second common optical path in the second configuration.

5. The air data sensor of claim 1, wherein the at least one common optical path is part of a ferrule, wherein the ferrule comprises a reference optical channel, wherein the at least one switch is configured to output the reference optical signal to the reference optical channel in the first and/or second configurations.

6. The air data sensor of claim 1, further comprising a frequency shifter coupled to the at least one switch, wherein the frequency shifter is configured to generate a Doppler-shifted reference signal, wherein the at least one switch is configured to output the Doppler-shifted reference signal to the at least one common optical path in a third configuration.

7. The air data sensor of claim 1, wherein the at least one switch comprises a plurality of switches, wherein a first switch of the plurality of switches is configured to output the reference optical signal and a first backscattered optical signal to a first common optical path, wherein a second switch of the plurality of switches is configured to output the reference optical signal and a second backscattered optical signal to a second common optical path.

8. A system, comprising:

a light source coupled to a vehicle and configured to generate a reference optical signal;

an optical transceiver coupled to the light source, wherein the optical transceiver is configured to transmit the reference optical signal external to the vehicle in a plurality of directions, and in response to receive backscattered optical signals from each of the plurality of directions;

at least one switch coupled to the optical transceiver, wherein the at least one switch is configured to output the reference optical signal and the backscattered optical signals to at least one common optical path, wherein each of the at least one common optical path receives the reference optical signal and at least one of the backscattered optical signals in sequence;

a detector coupled to the at least one switch via the at least one common optical path and configured to detect the reference optical signal and the backscattered optical signals received from the at least one switch;

at least one processor coupled to the detector, wherein the at least one processor is configured to determine at least one parameter based on the reference optical signal and the backscattered optical signals.

9. The system of claim 8, wherein the at least one processor is configured to determine an extent of systematic bias with respect to the at least one common optical path, wherein the at least one processor is configured to determine the at least one parameter based on the extent of systematic bias.

10. The system of claim 8, wherein the at least one common optical path comprises a single optical path, wherein the at least one switch is configured to output the reference optical signal and each of the backscattered optical signals to the single optical path in sequence.

11. The system of claim 8, wherein the at least one common optical path comprises a first common optical path and a second common optical path, wherein the at least one switch is configured to output the reference optical signal and a first backscattered optical signal to the first common optical path in sequence, wherein the at least one switch is configured to output the reference optical signal and the second backscattered optical signal to the second common optical path in sequence.

12. The system of claim 8, wherein the at least one common optical path are part of a ferrule, wherein the ferrule comprises a reference optical channel, wherein the at least one switch is configured to output the reference optical signal to the reference optical channel.

13. The system of claim 8, further comprising a frequency shifter coupled to the at least one switch, wherein the frequency shifter is configured to generate a Doppler-shifted reference signal, wherein the at least one common optical path is configured to receive the Doppler-shifted reference signal in sequence with the reference optical signal and the at least one of the backscattered optical signals.

14. The system of claim 9, wherein to determine the extent of systematic bias, the at least one processor is configured to determine an optical path length difference or phase difference between the reference optical signal as detected from a first common optical path and the reference optical signal as detected from a reference optical channel.

15. The system of claim 9, wherein to determine the extent of systematic bias, the at least one processor is configured to determine an optical path length difference or phase difference between the reference optical signal as detected from a common optical path at two different points in time.

16. A method, comprising:

generating a reference optical signal;

transmitting the reference optical signal external to a vehicle in a plurality of directions;

receiving a plurality of backscattered optical signals;

outputting one of the reference optical signal and at least one of the plurality of backscattered optical signals to at least one common optical path at a time;

determining an extent of systematic bias associated with the at least one common optical path; and determining at least one parameter compensated for the extent of systematic bias associated with the at least one common optical path.

17. The method of claim 16, wherein outputting one of the reference optical signal and at least one of the plurality of backscattered optical signals comprises:

outputting the reference optical signal and a first backscattered optical signal to a first common optical path in sequence; and outputting the reference optical signal and a second backscattered optical signal to a second common optical path in sequence.

18. The method of claim 16, wherein outputting one of the reference optical signal and at least one of the plurality of backscattered optical signals comprises:

outputting the reference optical signal and each of the plurality of backscattered optical signals to a single common optical path in sequence.

19. The method of claim 16, comprising:

outputting the reference optical signal to a reference optical channel distinct from the at least one common optical path.

20. The method of claim 16, comprising:

generating a Doppler-shifted reference optical signal; and outputting the reference optical signal, the Doppler-shifted reference optical signal, and the at least one of the plurality of backscattered optical signals to the at least one common optical path in sequence.

* * * * *